United States Patent
Schukalski

(10) Patent No.: US 9,308,835 B2
(45) Date of Patent: Apr. 12, 2016

(54) VEHICLE SEAT WITH AT LEAST ONE FITTING AND AN ACTUATING SHAFT

(71) Applicant: Brose Fahrzeugteile GmbH & Co. KG, Coburg, Coburg (DE)

(72) Inventor: Juergen Schukalski, Kueps (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 14/503,996

(22) Filed: Oct. 1, 2014

(65) Prior Publication Data

US 2015/0097405 A1   Apr. 9, 2015

(30) Foreign Application Priority Data

Oct. 9, 2013 (DE) .......................... 10 2013 220 359

(51) Int. Cl.
   *B60N 2/20*    (2006.01)
   *B60N 2/36*    (2006.01)
   *B60N 2/22*    (2006.01)
   *B60N 2/235*   (2006.01)

(52) U.S. Cl.
   CPC .. *B60N 2/20* (2013.01); *B60N 2/22* (2013.01); *B60N 2/2356* (2013.01); *B60N 2205/50* (2013.01)

(58) Field of Classification Search
   CPC .......... B60N 2/20; B60N 2/22; B60N 2/2356; B60N 2205/50
   USPC ........................................ 297/362.12, 378.12
   See application file for complete search history.

(56) References Cited

U.S. PATENT DOCUMENTS

| | | | | |
|---|---|---|---|---|
| 5,820,218 A * | 10/1998 | Baloche et al. | ............ | 297/367 R |
| 7,021,716 B2 * | 4/2006 | Persad et al. | ............. | 297/378.12 |
| 8,517,470 B2 * | 8/2013 | Roth et al. | ............... | 297/362.12 |
| 2008/0169695 A1 * | 7/2008 | Hahn | ....................... | B60N 2/12 297/367 R |
| 2010/0026073 A1 * | 2/2010 | Bruck | ...................... | B60N 2/20 297/378.1 |
| 2011/0121629 A1 * | 5/2011 | Roth et al. | ............... | 297/354.12 |
| 2011/0215626 A1 * | 9/2011 | Lehmann | ................. | B60N 2/20 297/354.12 |

FOREIGN PATENT DOCUMENTS

| | | |
|---|---|---|
| DE | 10 2004 030 320 B4 | 2/2006 |
| DE | 10 2006 015 138 A1 | 10/2007 |
| DE | 10 2008 028 102 A1 | 12/2009 |
| DE | 10 2008 047 660 A1 | 4/2010 |
| WO | WO 2012/022767 A1 | 2/2012 |

* cited by examiner

*Primary Examiner* — Rodney B White
(74) *Attorney, Agent, or Firm* — Lewis Roca Rothgerber Christie LLP

(57) ABSTRACT

A vehicle seat comprises a seat part, a backrest part and at least one fitting which connects the backrest part with the seat part pivotally about a pivot axis and is formed to hold the backrest part in position to the seat part, when it is in a locked condition, and to permit pivoting of the backrest part relative to the seat part, when it is in an unlocked condition. An actuating shaft connected with the at least one fitting, which extends along a longitudinal axis, can be pivoted about its longitudinal axis for actuating the at least one fitting. An actuating element for pivoting the actuating shaft is connected with the actuating shaft via a pulling means. A force introduction means is provided, which is arranged on the actuating shaft and includes a first lever arm and a second lever arm, wherein the pulling means engages the first lever arm and the second lever arm, in order to introduce an actuating force into the actuating shaft.

6 Claims, 2 Drawing Sheets

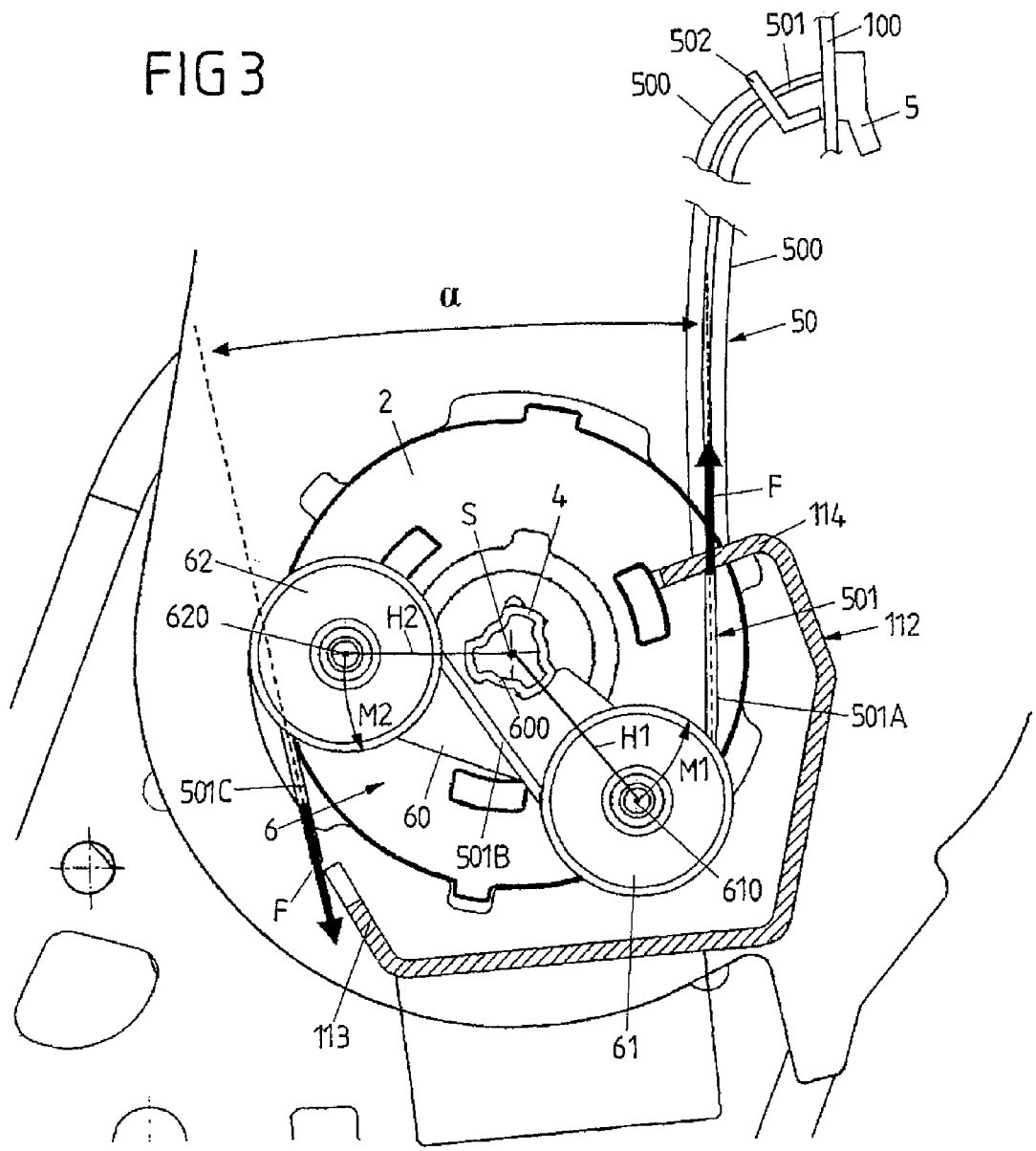

VEHICLE SEAT WITH AT LEAST ONE FITTING AND AN ACTUATING SHAFT

CROSS-REFERENCE TO RELATED APPLICATION

This application claims priority to German Patent Application No. 10 2013 220 359.4 filed on Oct. 9, 2013, the entirety of which is incorporated by reference herein.

BACKGROUND

The invention relates to a vehicle seat.

Such vehicle seat comprises a seat part, a backrest part and at least one fitting which connects the backrest part with the seat part pivotally about a pivot axis. The fitting is formed to hold the backrest part in position to the seat part, when it is in a locked condition, and to permit pivoting of the backrest part relative to the seat part, when it is in an unlocked condition.

In a manner known per se, the fitting can be formed as detent fitting or as rotary fitting and provides for pivoting of the backrest relative to the seat part for the purpose of adjusting the backrest inclination.

When there is provided a detent fitting using for example locking bolts of the type known from DE 10 2008 047660 A1, the fitting in a locked condition holds the backrest part in position to the seat part and in an unlocked condition provides for freely pivoting the backrest part relative to the seat part, in order to adjust the backrest inclination or to bring the backrest part into a forward-pivoted position in connection with a so-called easy-entry function, in which a space behind the vehicle seat is increased for example for the purpose of a facilitated access to a further seat arranged behind the vehicle seat.

When there is provided a rotary fitting for example in the manner of a wobble gear transmission as it is known from DE 10 2008 028102 A1, an additional unlocking means of the rotary fitting is present to provide an easy-entry function, which decouples the rotary fitting from the backrest part or from the seat part, so that in an unlocked condition the backrest part can freely be pivoted with respect to the seat part.

In connection with an easy-entry function of the vehicle seat, the backrest part is brought into a forward-pivoted position with respect to the seat part, so that an easy and convenient access to a further seat located behind the vehicle seat becomes possible for a user. To provide the easy-entry function, an actuating element for example in the form of an actuating lever is provided at an upper end of the backrest part, which can be actuated for unlocking the at least one fitting. By means of the actuating element, a user can pivot the backrest part forwards with a handle, so that the space behind the vehicle seat is increased.

In a vehicle seat, two fittings conventionally are provided on both sides of the vehicle seat, in order to pivotally couple the backrest part with the seat part. To ensure a synchronous actuation of the fittings, the fittings are connected with each other via an actuating shaft, as is described in DE 10 2008 047 660 A1. The actuating shaft extends in longitudinal direction and can be pivoted about its longitudinal axis, in order to actuate the fittings. The actuating element for providing the easy-entry function engages the actuating shaft and is connected with the actuating shaft via a pulling means, so that via the pulling means an actuating force can be introduced into the actuating shaft.

In a vehicle seat known from DE 10 2004 030 320 B4, an easy-entry actuating unit is coupled with a detent fitting via a Bowden cable. Upon actuation of the easy-entry actuating unit, the detent fitting is unlocked via the Bowden cable, so that the backrest can be pivoted into an easy-entry position folded forwards.

A vehicle seat with an easy-entry function also is known from WO 2012/022767 A1, whose contents will fully be included herein by reference.

The introduction of force into the actuating shaft conventionally is effected for example via a lever which is engaged by the pulling means coupling the actuating element with the actuating shaft. By means of such lever a torque is exerted on the actuating shaft, wherein at the same time transversal forces also occur at the actuating shaft, which can lead to a deformation of the actuating shaft. These transversal forces also act on the fittings coupled with the actuating shaft, which can increase the friction in the fittings and the wear thereof. This can also lead to an increase of the required actuating forces to be introduced via the actuating element, which can deteriorate the operating haptics of the vehicle seat.

SUMMARY

It is an object of the present invention to provide a vehicle seat which provides for an advantageous introduction of force into an actuating shaft for actuating one or more fittings coupled with the actuating shaft.

According to an exemplary embodiment of the invention, there is provided a force introduction means which is arranged on the actuating shaft and includes a first lever arm and a second lever arm, wherein the pulling means engages the first lever arm and the second lever arm for introducing an actuating force into the actuating shaft.

The present invention proceeds from the idea to provide a double-ended lever for introducing force into the actuating shaft. Correspondingly, the force introduction means includes two lever arms different from each other, which extend in different directions from the actuating shaft. The pulling means is mounted on the two lever arms such that via both lever arms a force or a torque is introduced into the actuating shaft.

Due to the fact that the pulling means engages different lever arms and thus introduces an actuating force into the actuating shaft via different lever arms, a torque advantageously can be transmitted to the actuating shaft, while transversal forces acting on the actuating shaft are reduced or even completely eliminated. This can be effected in that the transversal forces introduced at the lever arms just cancel each other out, but the torques acting on the lever arms add up.

Due to the fact that the transversal forces acting on the actuating shaft are reduced, the friction and the wear at the fittings coupled with the actuating shaft also are reduced. In addition, a reduced friction at the fittings can lead to a lower actuating force for actuating the fittings, which can improve the operating haptics of the vehicle seat as a whole.

The pulling means for example can be coupled with the force introduction means via a first redirecting element arranged at the first lever arm and a second redirecting element arranged at the second lever arm. The pulling means is guided on the redirecting elements and thus at least sectionally extends along the redirecting elements. The redirecting elements for example can be formed as deflection pulleys which are rotatably arranged on a base body of the force introduction means. It is, however, also conceivable to form the redirecting elements as portions stationarily formed on the base body in the manner of deflecting curves.

The pulling means preferably comprises a first portion which is connected with the actuating element. A second portion of the pulling means, on the other hand, is fixed at a holding bracket arranged on the seat part or the backrest part. The pulling means thus preferably extends from the actuating element towards the force introduction means and around the redirecting elements at the two lever arms towards the holding bracket. When the pulling means is mounted on the redirecting elements such that the torques acting on the lever arms just add up, a torque can be introduced into the actuating shaft by pulling at the pulling means and the at least one fitting coupled with the actuating shaft can be actuated thereby.

The holding bracket is to be arranged on the seat part when during pivoting of the backrest part relative to the seat part the actuating shaft is not pivoted as well. However, when the actuating shaft is moved along with the backrest part during pivoting of the backrest part, the holding bracket is to be arranged on the backrest part.

The first portion and the second portion at least approximately extend parallel to each other proceeding from the respectively associated redirecting elements, wherein the portions point in different directions proceeding from the respectively associated redirecting elements. By the fact that the portions extend approximately parallel to each other it is to be understood here that the portions describe an angle of for example less than 10°, preferably less than 5° to each other (reference is made to a position of the force introduction means with non-actuated actuating element, i.e. non-actuated fitting). The pulling means preferably is formed by a pull rope of a Bowden cable, which at least sectionally is guided in a Bowden tube of the Bowden cable. The Bowden tube for example extends between the actuating element and a fastening portion of the holding bracket and is supported on the fastening portion of the holding bracket, so that the pull rope extends freely between the fastening portion and the first redirecting element of the force introduction means. From the first redirecting element the pull rope then extends towards the second redirecting element and from the same again towards the holding bracket, at which it is fixed with its end facing away from the actuating element.

BRIEF DESCRIPTION OF THE DRAWINGS

The idea underlying the invention will be explained in detail below with reference to the exemplary embodiments illustrated in the Figures.

FIG. 3 shows a view of a force introduction means on an actuating shaft for actuating two fittings of the vehicle seat.

DETAILED DESCRIPTION

Figure 1:
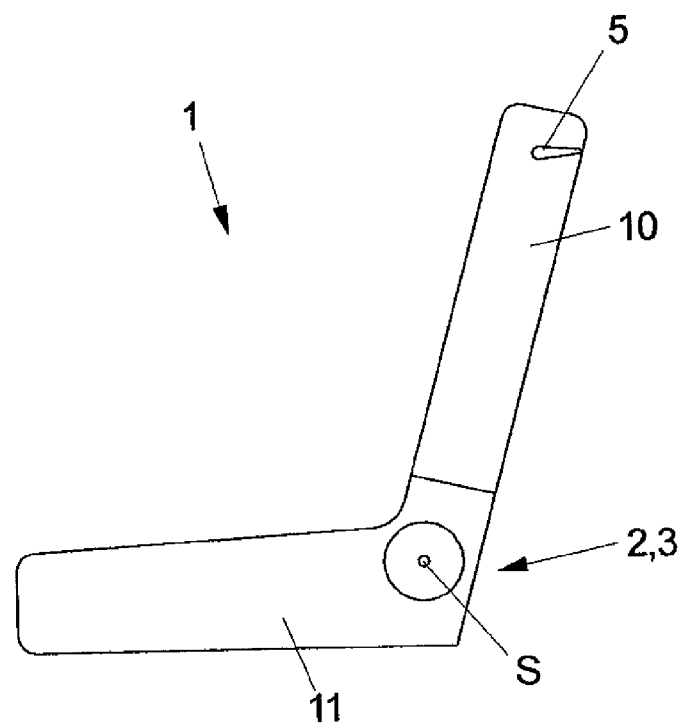
FIG. 1 shows a schematic side view of a vehicle seat.

FIG. 1 shows a schematic view of a vehicle seat 1 which includes a backrest part 10, which via fittings 2, 3 is arranged on a seat part 11 pivotally about a pivot axis S. The vehicle seat 1 for example can realize a rear seat, which for example is arranged in the second row in a vehicle which includes three seat rows.

The vehicle seat 1 for example can be fomed as described in WO 2012/022767 A1. The contents of WO 2012/022767 A1 will fully be included herein by reference.

Figure 2:
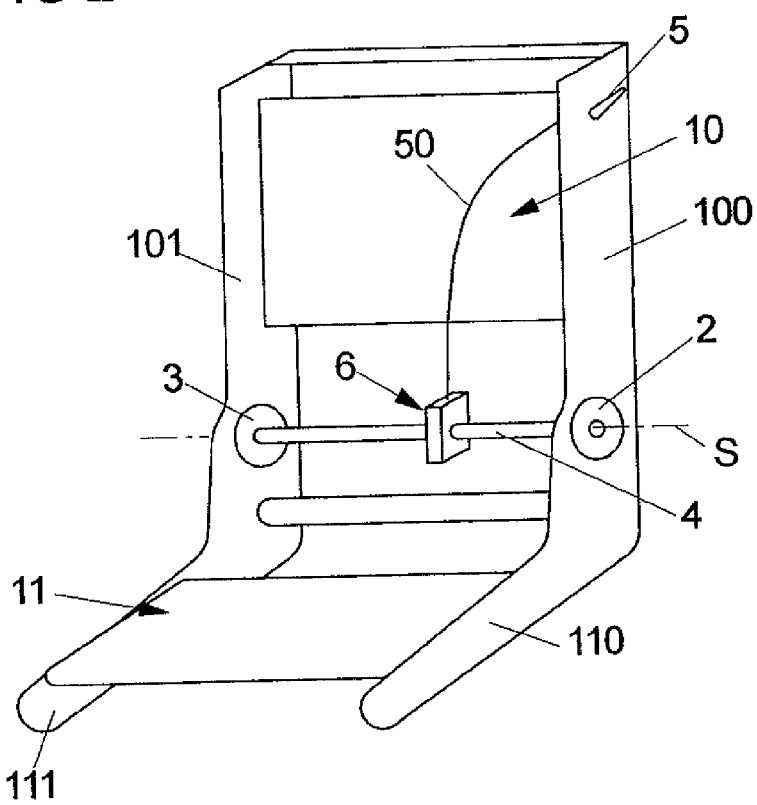
FIG. 2 shows a schematic view of the vehicle seat with a backrest part and a seat part.

As schematically shown in FIG. 2, the vehicle seat 1 includes two fittings 2, 3 which for example are formed as detent fittings as described in DE 10 2008 047 660 A1. The detent fittings 2, 3 each comprise a first fitting part, on which several locking bolts are radially shiftably arranged. In a locked position of the detent fitting, the locking bolts are in locking engagement with a toothing of a second fitting part and can be brought out of engagement with the toothing by radially shifting for unlocking the detent fitting. In an unlocked condition, the fitting parts then can be pivoted relative to each other, so as to adjust the backrest part 10 relative to the seat part 11.

The fittings 2, 3 pivotally connect frame parts 100, 101, 110, 111 of the backrest part 10 and the seat part 11 with each other about the pivot axis S, as is schematically shown in FIG. 2.

The fittings 2, 3 are connected with each other via an actuating shaft 4, which extends between the fittings 2, 3 along the pivot axis S and is coupled with both fittings 2, 3. Via the actuating shaft 4, the fittings 2, 3 can be actuated in a synchronous way.

For providing an easy-entry function, the vehicle seat 1 includes an actuating element 5 in the form of an actuating lever at an upper end of the backrest part 10, which actuating lever is connected with a force introduction means 6 via a Bowden cable 50 and with the actuating shaft 4 via the force introduction means 6. By actuating the actuating element 5, an actuating force can be introduced into the actuating shaft 4, in order to unlock the fittings 2, 3 by pivoting the actuating shaft 4 about the pivot axis S and thereby provide for forward-pivoting of the backrest part 10, in order to provide the easy-entry function.

FIG. 3 shows an exemplary embodiment of the force introduction means 6. The force introduction means 6 includes a base body 60 which via a cutout 600 is positively coupled with the actuating shaft 4 having a multi-edge profile and in this way is non-rotatably arranged on the actuating shaft 4. On the base body 60 two redirecting elements 61, 62 in the form of deflection pulleys are arranged, which each are rotatable about an axis of rotation 610, 620. On the redirecting elements 61, 62 a pull rope 501 of the Bowden cable 50 is guided and hence mounted on the base body 60.

The Bowden cable 50 is formed by the pull rope 501 and a Bowden tube 500 which extends between the actuating element 5 and the force introduction means 6. At its end associated to the actuating element 5, the Bowden tube 500, as shown schematically in FIG. 3, is supported on a fastening portion 502 at the frame part 100 of the backrest part 10. At its other, opposite end, however, the Bowden tube 500 is fixed at a fastening portion 114 of a holding bracket 112 firmly arranged on the seat part 11. In the Bowden tube 500 the pull rope 501 is guided from the actuating element 5 towards the force introduction means 6, wherein the pull rope 501 freely extends between the fastening portion 114 and the first redirecting element 61, is deflected at the redirecting element 61, mounted towards the second redirecting element 62, and extends from the second redirecting element 62 towards another fastening portion 113 of the holding bracket 112 at which the pull rope 501 is fixed.

With a first portion 501A, the pull rope 501 thus extends between the fastening portion 114 of the holding bracket 112 supporting the Bowden tube 500 and the first redirecting element 61, with a second portion 501B between the first redirecting element 61 and the second redirecting element 62, and with a third portion 501C from the second redirecting element 62 towards the fastening portion 113 of the holding bracket 112.

The pull rope 501 is installed on the redirecting elements 61, 62 such that upon introduction of a tensile force F into the pull rope 501 by the actuating element 5, two torques M1, M2 are introduced into the base body 60 and thereby into the actuating shaft 4, which are equidirectional and thus add up. The base body 60 forms two lever arms H1, H2 which extend in different directions from the actuating shaft 4 and are dimensioned by the distance of the axes of rotation 610, 620 to the pivot axis S of the actuating shaft 4.

When a tensile force F is exerted on the pull rope 501 by the actuating element 5, the tensile force F acts upwards on the portion 501A, as indicated in FIG. 3, and downwards on the portion 501C which is fixed at the fastening portion 113 of the holding bracket 112. Due to the fact that the portions 501A, 501C extend approximately parallel, i.e. at a very small angle α, to each other, the action of forces at the portions 501A, 501C is at least approximately opposite, so that the action of transversal forces on the actuating shaft 4 approximately cancels itself out. At the same time, the moments M1, M2 engaging the redirecting elements 61, 62, which due to the action of forces act at the portions 501A, 501C, are equidirectional about the pivot axis S, so that the torques M1, M2 add up and thus lead to pivoting of the actuating shaft 4 about the pivot axis S.

The force introduction means 6 realizes a double-ended lever with two differently oriented lever arms H1, H2. Due to the fact that the pull rope 501 is installed at the redirecting elements 61, 62 associated to the lever arms H1, H2 such that the introduced transversal forces subtract each other, but the introduced torques M1, M2 add up, an advantageous introduction of force is provided. In particular, the action of transversal forces on the fittings 2, 3 is reduced, which can lead to a reduced friction and a reduced wear at the fittings 2, 3 and in addition improves the operating haptics.

The holding bracket 112 is firmly arranged on the seat part 11. It is essential here that when the backrest part 10 is pivoted relative to the seat part 11, the actuating shaft 4 is not moved relative to the holding bracket 112.

In this connection it is also conceivable that when the backrest part 10 is pivoted, the actuating shaft 4 is moved as well. In this case, the holding bracket 112 must be arranged on the backrest part 10.

The idea underlying the invention is not limited to the exemplary embodiments described above, but can also be realized in completely different embodiments.

The pulling means for example is not necessarily part of a Bowden cable, but for example also can extend freely. In general, the pulling means can constitute a transmission means formed for transmitting tensile forces, for example a rope, a ribbon, a chain, a belt or the like.

The force introduction means does not necessarily include redirecting elements in the form of deflection pulleys, but there can also be provided redirecting elements in the form of stationary deflecting portions, for example deflecting curves or the like.

A force introduction means for coupling an actuating shaft with an actuating element not only is limited to an actuation in connection with an easy-entry function, but generally can be used in those actuating means in which an actuating force is to be introduced into an actuating shaft for actuating one or more fittings via a pulling means.

The invention claimed is:

1. A vehicle seat comprising:
   a seat part,
   a backrest part,
   at least one fitting which connects the backrest part with the seat part pivotally about a pivot axis and is formed to hold the backrest part in position to the seat part when it is in a locked condition, and to permit pivoting of the backrest part relative to the seat part when it is in an unlocked condition,
   an actuating shaft connected with the at least one fitting, the actuating shaft extending along a longitudinal axis and being pivotable about its longitudinal axis for actuating the at least one fitting,
   an actuating element for pivoting the actuating shaft,
   a pulling member via which the actuating element is connected with the actuating shaft and which is configured to introduce an actuating force from the actuating element into the actuating shaft, and
   a force introduction device which is arranged on the actuating shaft and includes a first lever arm and a second lever arm, wherein the pulling member engages the first lever arm and the second lever arm for introducing an actuating force into the actuating shaft,
   wherein the pulling member is configured to be guided on a first redirecting element at the first lever arm and on a second redirecting element at the second lever arm.

2. The vehicle seat according to claim 1, wherein the first and second lever arms extend from the actuating shaft in different directions and wherein the pulling member is configured to introduce equidirectional torques into the actuating shaft via the lever arms.

3. The vehicle seat according to claim 1, wherein the pulling member is fixed with a first portion with the actuating element and with a second portion at a holding bracket arranged on the seat part or the backrest part.

4. The vehicle seat according to claim 3, wherein the first portion and the second portion extend approximately parallel to each other.

5. The vehicle seat according to claim 3, wherein the pulling member is formed by a pull rope of a Bowden cable and sectionally guided in a Bowden tube of the Bowden cable.

6. The vehicle seat according to claim 5, wherein the Bowden tube extends between the actuating element and the holding bracket and is supported on a fastening portion of the holding bracket.

\* \* \* \* \*